(12) United States Patent
Ioannidis et al.

(10) Patent No.: US 11,780,141 B1
(45) Date of Patent: Oct. 10, 2023

(54) CONTINUOUS PROCESS FOR PRODUCING FOAMABLE CELLULOID

(71) Applicant: U.S. Government as Represented by the Secretary of the Army, Dover, NJ (US)

(72) Inventors: Nikolaos Ioannidis, Bloomfield, NJ (US); Zohar Ophir, West Orange, NJ (US); Viral Panchal, Parlin, NJ (US); Philip Abbate, Hackettstown, NJ (US); Francis Sullivan, Morristown, NJ (US); Ming Wan Young, Basking Ridge, NJ (US); Costas G. Gogos, Wyckoff, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 744 days.

(21) Appl. No.: 16/701,823

(22) Filed: Dec. 3, 2019

Related U.S. Application Data

(60) Provisional application No. 62/775,139, filed on Dec. 4, 2018.

(51) Int. Cl.
| | |
|---|---|
| *B29C 48/00* | (2019.01) |
| *B29C 48/395* | (2019.01) |
| *B29C 48/29* | (2019.01) |
| *C08J 9/00* | (2006.01) |
| *B01F 27/702* | (2022.01) |
| *B29K 1/00* | (2006.01) |

(52) U.S. Cl.
CPC .......... *B29C 48/0012* (2019.02); *B01F 27/702* (2022.01); *B29C 48/29* (2019.02); *B29C 48/397* (2019.02); *C08J 9/0023* (2013.01); *B29C 2948/92704* (2019.02); *B29K 2001/18* (2013.01); *C08J 2301/18* (2013.01)

(58) Field of Classification Search
CPC .............. B29K 2001/18; B29C 48/0012; B01F 27/702; B29C 48/29; B29C 48/397; C08J 9/0023; B29C 2948/92704; C08J 2301/18
See application file for complete search history.

(56) References Cited

U.S. PATENT DOCUMENTS

| | | | | |
|---|---|---|---|---|
| 4,120,920 | A * | 10/1978 | Cougoul et al. | B30B 11/24 149/96 |
| 4,715,723 | A * | 12/1987 | Anderson et al. | B01F 35/90 366/301 |
| 4,797,080 | A * | 1/1989 | Wanninger | B01F 27/702 366/300 |
| 4,909,898 | A * | 3/1990 | Padliya et al. | B29B 7/7485 159/DIG. 10 |

(Continued)

OTHER PUBLICATIONS

"Swiss Expertise in High Viscosity Processing", Mixing & Kneading Machinery, pp 30-32.

(Continued)

*Primary Examiner* — Jeffrey M Wollschlager
(74) *Attorney, Agent, or Firm* — John P. DiScala

(57) ABSTRACT

The present invention is directed to a continuous process for producing a foamable celluloid product by introducing a solid component (comprising nitrocellulose, chemical blowing agent (CBA), stabilizer and alcohol) and a liquid component (comprising camphor and acetone) into a mixer/devolatilizer machine where the chamber is under atmospheric pressure and having significant overhead space. The chamber is comprised of two zones wherein the first zone has a temperature that is less than the second zone and at least one rotor comprising hollow, temperature-controlled arms having a tilted angle affixed to the rotors. The rotors of the mixer/devolatilizer machine act to mix the solid and liquid components under lower shearing forces, lower mechanical stress and longer residence times than those used by twin-screw extruders.

16 Claims, 3 Drawing Sheets

(56) References Cited

U.S. PATENT DOCUMENTS

| | | | | |
|---|---|---|---|---|
| 5,487,851 | A * | 1/1996 | Dillehay et al. | C06B 21/0075 |
| | | | | 264/3.3 |
| 5,569,429 | A * | 10/1996 | Luker | B29C 48/92 |
| | | | | 425/208 |
| 8,519,093 | B2* | 8/2013 | Diener et al. | C08C 2/00 |
| | | | | 528/480 |
| 9,079,984 | B2* | 7/2015 | Witte et al. | B01J 3/008 |
| 9,539,752 | B2* | 1/2017 | Dubois et al. | B29C 48/145 |
| 2005/0024987 | A1* | 2/2005 | Kunz et al. | B29B 7/845 |
| | | | | 366/97 |
| 2007/0148320 | A1* | 6/2007 | Uchiyama | B29C 48/501 |
| | | | | 426/512 |
| 2011/0211420 | A1* | 9/2011 | Arnaud et al. | B01F 27/211 |
| | | | | 366/196 |
| 2011/0294978 | A1* | 12/2011 | Diener et al. | B29C 48/37 |
| | | | | 528/480 |
| 2015/0131401 | A1* | 5/2015 | Witte | B01F 27/707 |
| | | | | 366/98 |
| 2015/0273731 | A1* | 10/2015 | Fleury et al. | B01F 27/702 |
| | | | | 422/135 |
| 2020/0047390 | A1* | 2/2020 | McDaniel et al. | B29C 48/57 |
| 2020/0282622 | A1* | 9/2020 | Ougier et al. | B22F 5/06 |

OTHER PUBLICATIONS

Kunkel, Roland, "A Clever Alternative", Process Worldwide, pp28-29, May 2010.

* cited by examiner

CONTINUOUS PROCESS FOR PRODUCING FOAMABLE CELLULOID

RELATED APPLICATIONS

This application claims priority to U.S. Provisional Application No. 62/775,139 filed on Dec. 4, 2018, the contents of which are hereby incorporated herein in its entirety.

RIGHTS OF THE GOVERNMENT

The inventions described herein may be manufactured and used by or for the United States Government for government purposes without payment of any royalties.

FIELD OF INVENTION

The present disclosure relates to process for continuous preparation of foamable celluloid. More specifically, the present process relates to continuous production of foamable celluloid using a single or twin shaft automated mixer/devolatilizer machine.

BACKGROUND OF THE INVENTION

The legacy batch process for preparing celluloid has difficulty maintaining consistency between batches, is very labor intensive leading to slower production rates and higher costs, is environmentally unfriendly, and produces low yield finished products. The process starts with the use of an internal batch mixer that mixes nitrocellulose (NC) with acetone which dissolves in the presence of ethanol and camphor. Some of these liquid components act as a plasticizer for NC and give it "plastic" properties. After a certain period of mixing, component incorporation, and removal of some of the solvents, the mixture is removed and transferred to an open air two-roll mill for further mixing and solvent removal at which time the mixture is leather-like in mechanical properties. Leathery strips ("hides") are then stacked and consolidated in the presence of pressure and moderate temperature to form "blocks" of celluloid, often as sliced dry celluloid. FIG. 1 is an illustration of the current state of the art for producing celluloid using the batch process.

The method of batch producing celluloid, the first man-made plastic, was invented by John W. Hyatt in the 1870s. For a period, it was extensively used for shaping it into useful products by plastics processing methods, such as injection molding. In addition to the noted drawbacks for producing celluloid, the marketplace demand for such materials were reduced due to the widespread availability of easy to produce and economical hydrocarbon-based plastics that are prevalent today.

In addition to the batch process described above, U.S. Pat. No. 9,539,752 issued to Chales Duboi et al describes a continous process for preparation of celluloid using a twin-screw extruder method.

The present disclosure addresses some of the drawbacks associated with preparing celluloid under the batch and twin-screw methods identified above.

SUMMARY OF THE INVENTION

The present invention is directed to a continuous process for producing a foamable celluloid product by introducing a solid component (comprising nitrocellulose, chemical blowing agent (CBA), stabilizer and alcohol) and a liquid component (comprising camphor and acetone) into an automated mixer/devolatilizer machine. The present invention differs over existing twin-screw extrusion methods by partially filling the machine chamber and thereby leaving significant overhead "free" space that is not occupied by the processed material. This allows for the entire mixing process within the chamber to be conducted under atmospheric pressure. In addition, each of the two shafts with blades may contain a different number of blades, oriented at a different angles, and can be rotated at a different speed in order to achieve optimal material mixing and continuous surface renewal. In another embodiment such as the single shaft design of the mixer/devolatilizer, the angles of the shaft-mounted mixing elements (e.g. blades or hooks) and the wiping elements (e.g. blades or hooks) that are mounted to the inner wall of the mixing/devolatilizing chamber may be oriented to achieve optimal composition mixing and surface renewal conditions. The chamber is comprised of two zones wherein the first zone has a temperature that is less than the second zone and at least one rotor comprising hollow arms having a tilted angle affixed to the rotors. The rotors of the mixer/devolatilizer act to mix the solid and liquid components under lower shearing forces, lower mechanical stress, and longer residence times than those used by twin-screw extruders.

BRIEF DESCRIPTION OF THE DRAWINGS

Further features and advantages of the present invention may be understood from the drawings.

DETAILED DESCRIPTION

Figure 1:
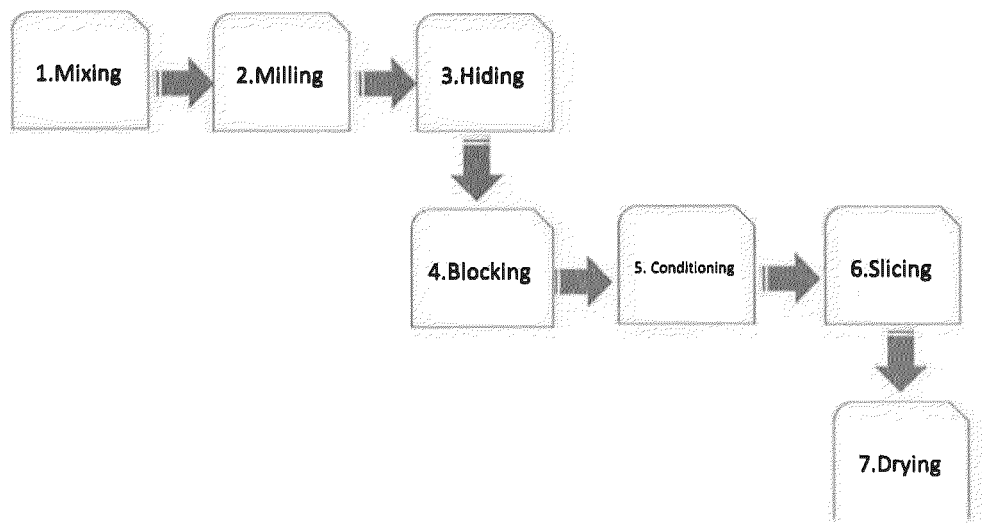
FIG. 1. Representative schematic of the current state of the art process for preparing foamable celluloid under a batch process.

Described herein is a process for preparing foamable celluloid continuously in a process equipment environment where all the ingredients — including the needed chemical blowing agent — are fed continuously into the processor, mixed, and advanced downstream. The present process is an improvement over current state of the art processes. This is achieved by controlling and maintaining the temperature levels of the chamber to remove a large fraction of the solvent (and where feasible, recycling of removed solvents back into the feed stream), and continuously producing uniform foamable celluloid having characteristics similar (high viscosity and elasticity) to celluloid produced using the legacy batch process. Alternatively, the disclosed process permits devolatilization of nearly all the solvent. This is possible because of the long residence time (on the order of minutes) afforded by the mixer-devolatilizer, which overcomes the short devolatilization times (of the order of seconds) in legacy twin-screw extruders.

The process disclosed herein is an improvement over the present state of the art twin-screw extrusion process for producing foamable celluloid, which requires the processing chamber to be fully filled with the celluloid components for at least a portion of its length. This could lead to the risk of mixing temperature sensitive material in a confined environment, which can lead to product degradation. The product instability comes from fully filled regions of twin-screw extrusion which introduces large mechanical energy input rates because of the use of high rotational speeds (typically 200 to 1000 rpm) under short residence times (about 30 seconds to 3 minutes) to the celluloid components being mixed. This applies large stresses to the viscous celluloid components, which can lead to "hot spots", which if greater than 105° C., can decompose the chemical blowing agent.

In contrast, the process disclosed herein uses an unconfined, continuously and entirely partially filled mixing chamber longer residence times, and small to moderate mechanical energy input rates at an order of magnitude less than the twin-screw extrusion methods (typically 25-50 rpm and preferable 10 - 40 rpm). By using low mechanical energy input and allowing for longer residence time (about 15-70 minutes) under less mechanical stress, the temperature of the system can be more accurately controlled throughout the processing stream. Because the processing machine utilizes only 60-80% of the total fill space, it leaves adequate free volume for solvent devolatilization. This allows the processed stream to devolatilize solvents by a diffusional devolatilization gradually and at the entire length of the process chamber under standard atmospheric pressure, mild vacuum and slightly elevated temperature conditions. In contrast, twin-screw extrusion achieves devolatilization only at one or more axial vent port locations where high vacuum is applied causing a solvent bubble to form and rapid devolatilization to occur. In order to be able to apply a high vent port vacuum, both the vent port upstream and downstream regions have to become "melt seals" that is fully filled and pressurized. This results in highly sheared and heated regions that creates dangerous conditions for processing highly viscous celluloid material under low solvent conditions.

The present invention overcomes the creation of hot spots by having a larger equipment heat transfer area (by an order of magnitude) compared to the corresponding size/production rate of twin-screw extruders. The hot spots can also be reduced by using hollow, temperature-controlled rotor shafts and arms or blades that are attached to the shafts. Hollowed rotor shafts and screws would not be feasible given the higher stress forces placed on the twin-screw blades from the highly viscous material.

The method disclosed herein may be used on either a twin or single shaft continuous mixer/devolatilizer with mixing elements (e.g. paddles, hooks, blades, etc.) fixed to the shafts (both models available from LIST™). The machines suitable for use with the methods disclosed here are available in patent publications: EP0804278, EP0853491, EP1078682, EP0853491, EP1078682, EP1436743, EP1436073, EP2328677, DE102009010393, DE102012106872, DE102012103565, DE DE102012108261, EP2780510, the contents of which is incorporated herein in its entirety.

The foamable celluloid produced using this process has the same desirable characteristics of being highly viscous and elastic as those prepared using the batch process. The process also allows for controlled heating during mixing and especially during devolatilization.

Figure 2:
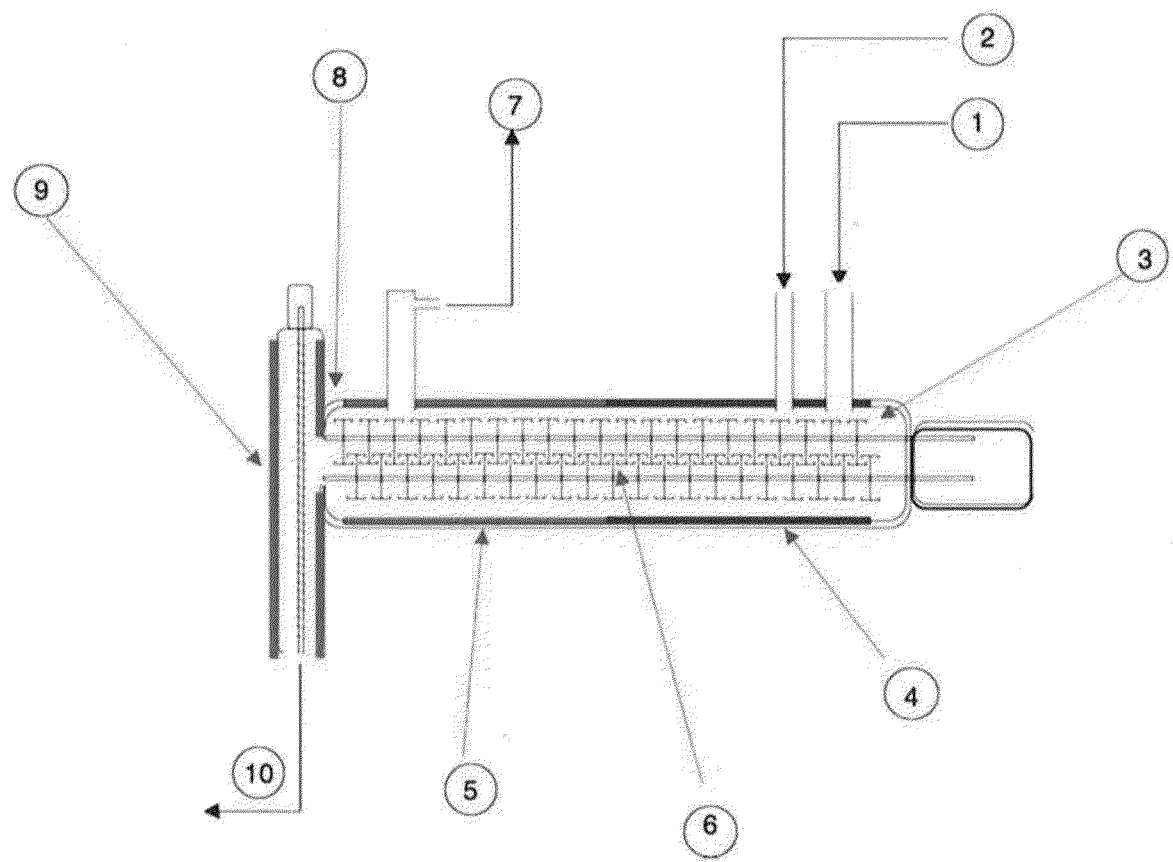
FIG. 2. Illustrates an exemplary mixer/devolatilizer utilized in the present invention.

The foamable celluloid is usually prepared by mixing together nitrocellulose, camphor, chemical blowing agent (CBA), stabilizer, alcohol and acetone. Once the materials are mixed to form a homogenous mixture, excess solvents are removed to end up with a celluloid product which contains a desired amount of solvents. The entire mixing process is performed under atmospheric pressure using low mixing speeds. FIG. 2 illustrates an exemplary continuous process for producing foamable celluloid using a single or twin rotor mixer/devolatilizer processing machine. The final mixed foamable celluloid product may optionally be extruded through an extrusion die or rollers that can extrude celluloid in various shapes such as strands, pellets or thick sheets.

In processing the celluloid mixture, the mixer/devolatilizer machine should have a chamber exposed to atmospheric pressure. An exemplary machine is the mixer/devolatilizer machine available from LIST (www.listdryprocessing.com). The machine may have two feed ports: a solids feed port 1 and a liquid feed port 2. The solids feeding consist of alcohol-wet NC which is premixed with CBA and a stabilizer. The solids need to be fed at a constant rate, which can be accomplished by a gravimetric feeder, or by a similar constant mass feeding rate device. The fed solids stream may be purged by inert gas, the flow of which is sufficient for excluding most of the air from the solids feeding stream, but having sufficiently low flow, that it does not flush away a significant portion of the alcohol. Alternatively, if desired, it is possible to feed all solids by separate constant rate feeding devices. The liquid feeding stream 2 may consist of a solution of camphor in acetone and additional quantity of alcohol if needed to obtain good mixing conditions. The liquids are fed at a constant rate by any suitable liquids metering pump, which can provide constant flow rate of the liquid mixture. The processing chamber 3 is usually divided into two sections or zones which are heated by jackets and maintained at different temperatures. The first section 4 is kept at lower temperature, where the components dissolve while the evaporation of the solvents is kept to a minimum. This section is also called the mixing section or zone. The second section 5 is heated to a higher temperature, allowing for evaporation of the excess solvent, but not high enough to trigger decomposition of the CBA, or of the NC itself. This section is called devolatilization section or zone. The materials in the mixing chamber 3 are mixed together by either one or two rotors 6, which have rotor shafts connected to mixing elements arranged in a blade configuration that effectively mixes the components while inducing minimal viscous dissipation in the homogenous viscous mixture. This is achieved by maintaining a low rotor rate so that mild mechanical energy is introduced to the mixture. In a two-rotor configuration, one shaft mixes the celluloid while the other cleans the product that can accumulate on the mixing shaft. Improved mixing of the mixture can be achieved by rotating the mixing and cleaning shafts at different speeds. An example of different rotor shaft speeds may be at a ratio of 5:4 (cleaning to mixing). The blades are also tilted slightly forward in order to drag/push the processed stream gradually and in a truncated fashion from the mixing section, through the devolatilization section towards the entrance of the discharge port 10. The rotor shafts as well as mixing elements fixed to the shafts in larger capacity machines may also be heated and may provide additional independent temperature control. This can be achieved with, heating elements placed inside the hollow mixing elements. The temperature on the surface of the mixing elements can be intermediate between that of the mixing zone and the devolatilization zone. Although the main roles of the mixing zone and the devolatilization zones are different, the transition of the material from one zone to the other zone is gradual. Slow and partial evaporation of solvents may already occur in the mixing zone and additional mixing continues to take place in the devolatilization zone to produce a uniform material that exits the mixing chamber.

The vapors are removed through vapor removal port 7 with the help of a vacuum pump and are collected by a chilled condenser. The flowrate of the vapor can be controlled by the temperature of the devolatilization zone and monitored by the accumulated liquid in the condenser (either by weight or by volume). An additional solvent feeding port 8 may be added. The solvent feeding port 8 may allow for addition of solvent to the mixture in case the devolatilization is too intensive and the solvent content of the celluloid mixture becomes too low towards the end of the process. At the end of the devolatilization zone, the accumulating celluloid mixture is pushed by the rotor blades into an entrance of a twin or single screw drag pump 9 designed to pump celluloid out of the processor and towards a discharge port 10.

Example 1 Process Using the LIST CRP 2.5 Batch

The LIST CRP 2.5 Batch is equilibrated to a temperature of 50° C., for 1 hour. In parallel, 1.3 kg of a 30 wt % ethanol-wet nitrocellulose with a nitrogen content of 11.55 wt% is tumbled mixed for 1 hour at 300 rpm, with 0.5 kg of ethanol to increase the total ethanol content in the nitrocellulose to 50 wt% and with 4 wt% chemical blowing agent. After this 600 g of a 50 wt% pre-dissolved camphor/acetone solution is charged to the LIST machine while the rotors are rotated at 20 rpm. The 1.8 kg of the tumbled-mixed ethanol wet nitrocellulose is loaded to the LIST machine, while the rotors are still rotating at 20 rpm. The total initial solvent content of the composition is 46 wt%.

After the raw materials are loaded to the LIST machine, the rotor speed is raised to 75 rpm and mixing is continued for 1 hour while the temperature is maintained at 50° C. During this stage there is no solvent evaporation.

Once a homogenous, dough-like material is formed, the set temperature of the LIST machine is raised to 85° C., while the rotor speed is maintained at 75 rpm.

During the next 30-40 minutes, the melt temperature is continuously rising from 50° C. to 78° C. As the melt temperature approaches 78° C., evaporated solvent begins to condense in the condenser. Once the melt temperature reaches 78° C. the solvent evaporation rate is maximized and there is noticeable flow of condensed solvent in the condenser which continues for another 30-40 minutes while the melt temperature is constant between 78° C. and 80° C. After this period, and while a considerable amount of solvent has been removed, the melt temperature begins to increase due to the limited amount of solvent present in the system and due to the increased viscosity of the material.

Once a certain solvent weight is collected in the condenser, the rotors are stopped and the set temperature is lowered to 30° C. to cool the product. The LIST machine chamber is then opened and foamable celluloid with a solvent content of ~17 wt% is collected (solvent content later verified by gravimetric methods).

Example 2 Process Using Continuous LIST CRP 2.5 Conti

The LIST CRP 2.5 Conti had only one heating zone, however, the process for making celluloid requires a low temperature for the mixing/dissolution stage (50° C.) and a higher temperature for the devolatilization stage (85° C.). To circumvent this limitation of the CRP 2.5 Conti, the process is run as two separate continuous processes in series. This limitation does not exist in larger scale processors that possess at least two or more axially sequential heating zones.

Stage 1: The LIST CRP 2.5 Conti machine is equilibrated at 50° C. for 1 hour. In parallel, 10.7 kg of a 30 wt% ethanol-wet nitrocellulose with a nitrogen content of 11.55 wt% are tumbled-mixed for 1 hour at 300 rpm, with 4.3 kg of ethanol to increase the total ethanol content of the ethanol-wet nitrocellulose to 50 wt % and the 4 wt% chemical blowing agent. Once the premixing is complete, the material is loaded to the hopper of a pre-calibrated volumetric feeder positioned on top of the feeding throat of the LIST machine. The speed of the rotors is then set to 50 rpm, the volumetric feeder is switched on and the premixed nitrocellulose is fed into the LIST machine at a rate of 1.5 kg/hr. At the same time, a 50 wt % pre-dissolved camphor-acetone solution is fed into the LIST machine at a rate of 0.5 kg/hr using an HPLC pump. The speed of the twin screw drag discharge pump at the end plate of the LIST machine is set to 25 rpm. About 1 hour later, and after the raw materials have been dissolved and mixed, celluloid with a total solvent content of 46 wt % begins to fill the first of the two accumulators/reservoirs (downstream from #10), which are piston-equipped cylindrical metal containers connected at the end of the twin-discharge screw pump of the mixer-devolatilizer, used as holding tanks for the solvent rich celluloid between the two process stages and for feeding the material (as a piston-driven positive displacement pump) into the feed port of the LIST mixer-devolatilizer during the second stage of the process. Similarly, to Example 1, there is no solvent evaporation during Stage 1.

With the piston fully extended, each accumulator can hold up to 4 kg of solvent-rich celluloid. Based on the feeding rate used above it takes ~2 hr to fill each accumulator. Once both accumulators have been filled, the process is stopped, and the equipment is prepared for Stage 2. To reduce the amount of force needed to push the accumulator piston to feed the celluloid material to the LIST machine during stage 2, both accumulators/reservoirs are stored overnight underwater in a temperature immersion water bath at 60° C.

Stage 2: The LIST machine is equilibrated at 85° C. for 1 hour, while the volumetric feeder used in Stage 1 to feed the ethanol wet nitrocellulose is replaced by the first of two fully filled accumulators mounted vertically on the feeding throat of the LIST machine using a connection flange. A gear pump is connected to the piston of the accumulator to push the piston and feed the solvent rich celluloid into the LIST machine at a rate of 1.2 kg/hr. The position of the piston over time and therefore the celluloid feed rate can be monitored using a caliper inserted at the back of the piston. Both the accumulator and the connecting flange are wrapped with an electric heating tape set to 60° C. to prevent the celluloid from cooling down and becoming non-flowable. For Stage 2, the rotors speed is set to 50 rpm while the twin discharge screw speed is set to 10 rpm.

Figure 3:
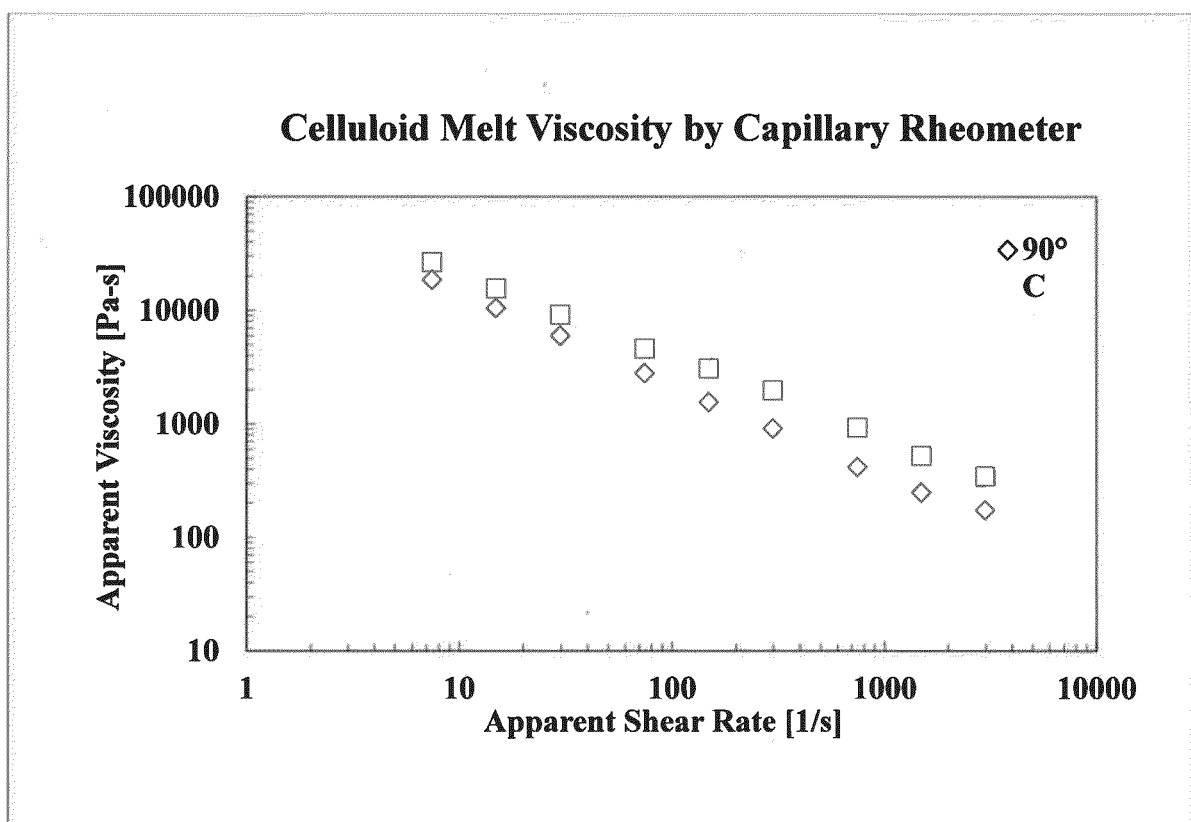
FIG. 3. A chart characterizing the melt viscosity of the foamable celluloid prepared under the present process.

Approximately 30 minutes after starting the feeding of the solvent rich foamable celluloid into the LIST machine, evaporated solvent begins to condense. Approximately 1 hour after starting the feeding (30 minutes after the evaporated solvent begins to condense), foamable celluloid with a solvent content of ~15 wt% begins to exit from the twin-screw discharge drag pump circular opening die. Every few minutes, a length of a very viscous foamable celluloid "rope" approximately one inch in diameter is collected, sealed into aluminum bags and placed in an ice slurry bucket to cool down. Such samples are kept cold to prevent loss of solvent and used for the characterization of the foamable celluloid product. FIG. 3 is a chart characterizing the celluloid melt viscosity for the foamable celluloid product by capillary rheometer.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description but by the claims and any equivalents.

We claim:

1. A process for preparing foamable celluloid comprising:

introducing into an automated machine a celluloid composition comprising nitrocellulose, camphor, blowing agent, and at least one volatile liquid, wherein the automated machine comprises an enclosed, temperature-controlled chamber, comprising at least one rotor shaft along the interior longitudinal axis of the enclosed chamber, and wherein the rotor shaft comprises at least one mixing element fixed to the shaft and wherein a continuous, partially filled volume is maintained throughout the chamber;

mixing the celluloid composition to obtain a homogenous mixture with the at least one mixing element and removing the at least one volatile liquid of the celluloid composition; and discharging foamable celluloid from the chamber;

wherein the celluloid composition is subject to non-pressurized conditions in the temperature-controlled chamber.

2. The process of claim 1, wherein the celluloid composition further comprises alcohol.

3. The process of claim 1 wherein the rotor speed is about 10 - 50 rpm and the residence time of the celluloid composition in the chamber is at least 15 minutes.

4. The process of claim 1, wherein the rotor speed is about 25 - 40 rpm and residence time of the composition in the chamber is about 15 minutes to 70 minutes.

5. The process of claim 1, wherein the automated machine comprises two rotor shafts.

6. The process of claim 1, wherein the automated machine comprises a single rotor shaft.

7. The process of claim 5, wherein the rotor shafts are rotated at different speeds and wherein the different speeds of the rotor shafts are in a fixed ratio to each other.

8. The process of claim 1, wherein the automated machine further comprises a co-rotating, twin-screw pump, discharging foamable celluloid from the chamber.

9. The process of claim 1, wherein the volatile liquid is reintroduced back into the chamber.

10. The process of claim 1, wherein the celluloid composition further comprises a stabilizer.

11. The process of claim 1, wherein the at least one mixing element is hollow.

12. The process of claim 1, wherein the at least one mixing element is temperature controlled through the use of heating elements positioned within the at least one mixing element.

13. The process of claim 1, wherein the chamber comprises a first zone and a second zone.

14. The process of claim 13, wherein the temperature of the first zone is less than the temperature in the second zone.

15. The process of claim 13, wherein the celluloid composition is mixed in the first zone.

16. The process of claim 13, wherein the removal of the at least one volatile liquid is performed in the second zone.

* * * * *